SYSTEM FOR TESTING INTERMEDIATE AMPLIFIERS

Filed May 13, 1947 5 Sheets-Sheet 1

William Henry Bernard Cooper
Winston Theodore Duerdoth
By Hall & Houghton
attorneys

SYSTEM FOR TESTING INTERMEDIATE AMPLIFIERS

Filed May 13, 1947 5 Sheets-Sheet 2

William Henry Bernard Cooper
Winston Theodore Duerdoth
By Hall & Houghton
attorneys May 1, 1951 W. H. B. COOPER ET AL 2,550,782

SYSTEM FOR TESTING INTERMEDIATE AMPLIFIERS

Filed May 13, 1947 5 Sheets-Sheet 3

William Henry Bernard Cooper
Winston Theodore Duerdoth
By Hall & Houghton
attorneys May 1, 1951 W. H. B. COOPER ET AL 2,550,782

SYSTEM FOR TESTING INTERMEDIATE AMPLIFIERS

Filed May 13, 1947 5 Sheets-Sheet 4

William Henry Bernard Cooper
Winston Theodore Duerdoth
By Hall & Houghton
Attorneys

SYSTEM FOR TESTING INTERMEDIATE AMPLIFIERS

Filed May 13, 1947 5 Sheets-Sheet 5

William Henry Bernard Cooper
Winston Theodore Duerdoth
By Hall & Houghton
attorneys Patented May 1, 1951 2,550,782

UNITED STATES PATENT OFFICE 2,550,782

SYSTEM FOR TESTING INTERMEDIATE AMPLIFIERS

William Henry Bernard Cooper, Ruislip, and Winston Theodore Duerdoth, Greenford, England Application May 13, 1947, Serial No. 747,810
In Great Britain March 27, 1946

Section 1, Public Law 690, August 8, 1946
Patent expires March 27, 1966

23 Claims. (Cl. 179—175.31)

This invention relates to communication systems of the type which comprises terminal stations and intermediate amplifying means between the terminal stations.

In such systems it is desirable periodically to ascertain the performance of the intermediate amplifying means and it is an object of this invention to enable such ascertainment to be effected from a terminal station.

It is a further object of the invention to provide that the performance of the intermediate amplifying means may be ascertained from one of the terminal stations only.

A further object of the invention is to provide a method and means whereby the degree of non-linearity of the amplitude characteristic of an intermediate amplifier can be determined at a terminal station.

Another object of the invention is to provide a method and means whereby the power level at the output of an intermediate amplifier can be determined at a terminal station.

Further objects of the invention may be ascertained from the following description.

According to the invention a communication system, of the type which comprises terminal stations and intermediate amplifying means between the terminal stations, is provided at a terminal station with means for transmitting a pulse of a determined frequency or transmitting simultaneously pulses of different determined frequencies along the system; and is provided with means at a terminal station arranged to receive, and to measure the amplitude of, a pulse of frequency different from the transmitted pulse frequency or frequencies.

The invention further provides, in a communication system of the kind in which information is transmitted in one direction between terminal stations and through a number of intermediate amplifier stations over an upper frequency band and in the other direction over a lower frequency band, means at a terminal station for transmitting over the lower frequency band pulses of determined frequency at desired intervals, and with means arranged to receive, and to measure the amplitude of, pulses of frequency higher than that of the transmitted pulses, as well as means arranged to measure the time delay between the transmission of a pulse and the reception of the pulse of higher frequency; and is further provided, at each intermediate amplifier station, with means arranged to direct intermodulation products of each intermediate amplifier to the receiving means at the said terminal station.

Instead of transmitting pulses of only one frequency pulses of different frequencies may be transmitted simultaneously over the higher frequency band or, in other words, a complex pulse may be transmitted and a pulse of frequency lower than that of the transmitted pulses be received at the terminal station which transmits the pulses.

In order to enable the power level at an intermediate amplifier to be checked the invention in one embodiment thereof, provides for the connection of a device having a non-linear voltage-current characteristic to the system at the intermediate amplifier.

The invention will be described, by way of example, with reference to the accompanying drawings in which Fig. 1 is a block schematic diagram of a two band system employing a number of intermediate amplifiers in tandem and showing in block representation the apparatus provided by the invention at terminal stations.

Figure 6:
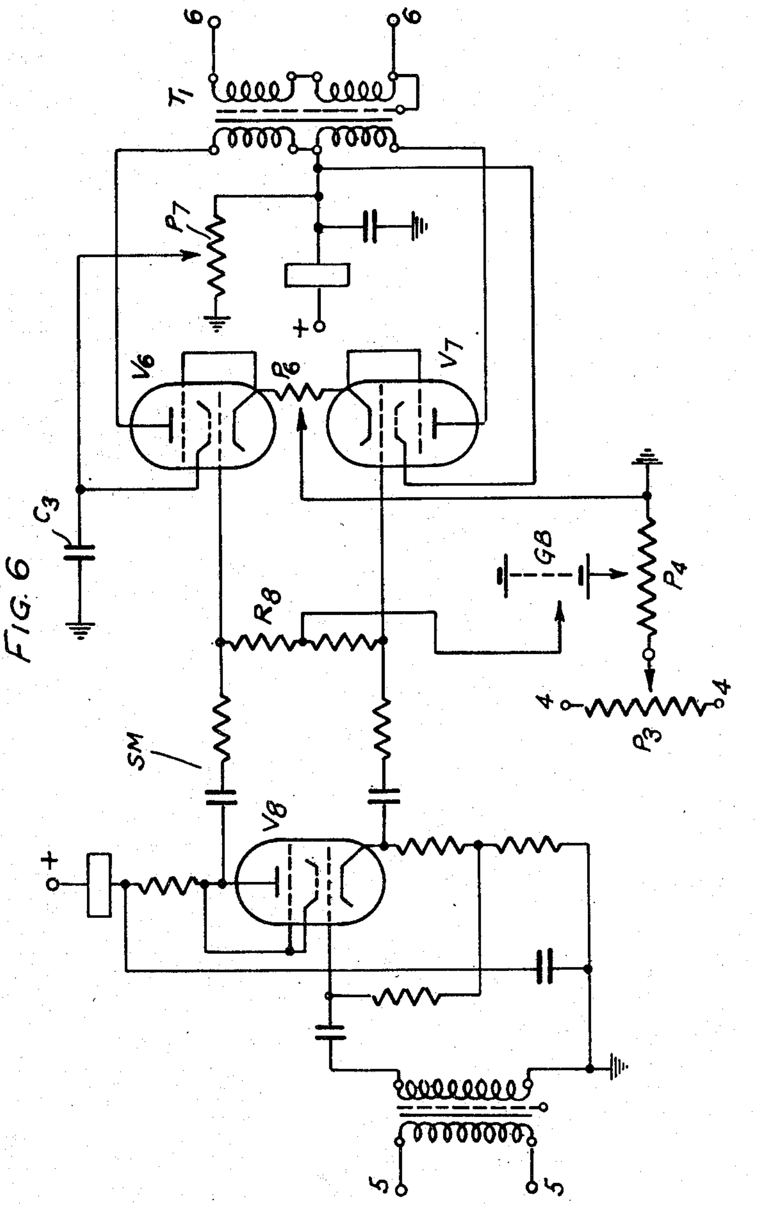

Fig. 6 a circuit diagram of a switching modulator, and

Figures 3, 5, 7:
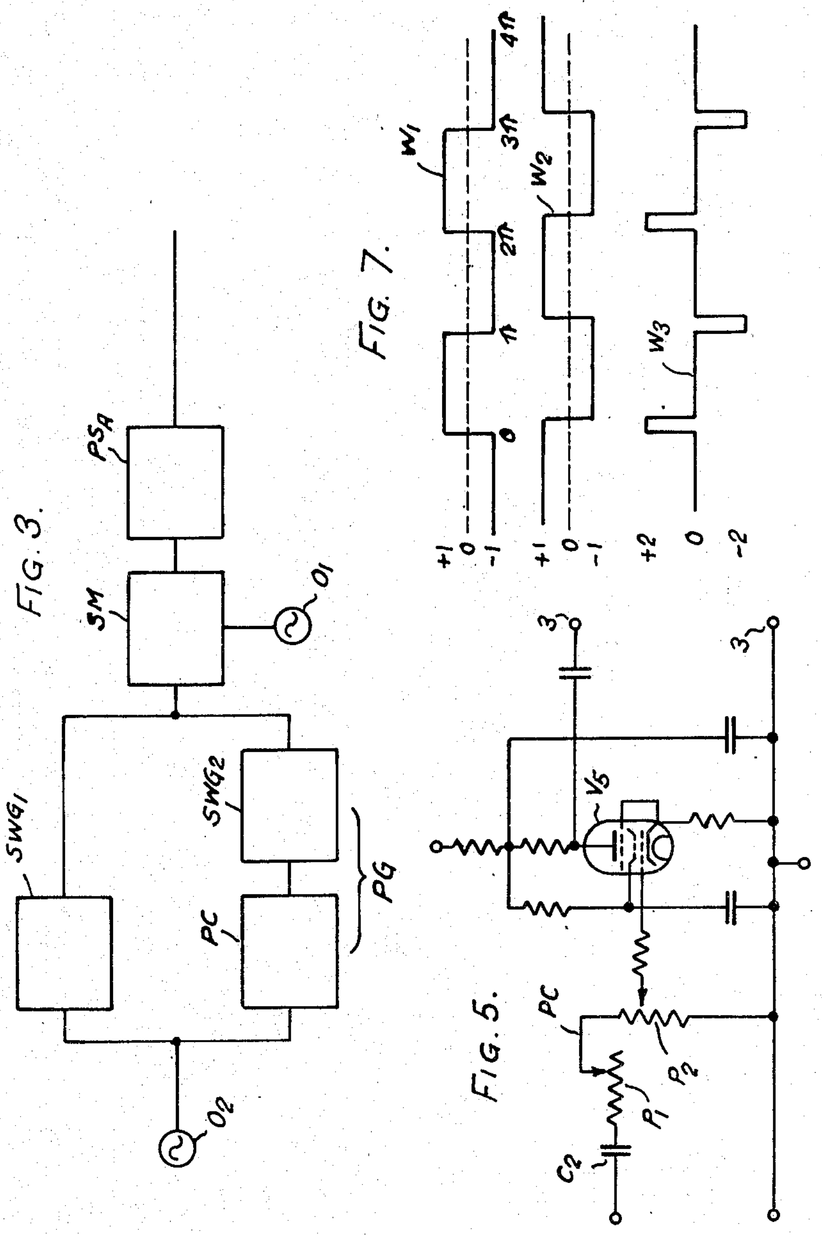
Fig. 3 is a block schematic diagram of the pulse generating and transmitting equipment.
Fig. 5 shows a circuit arrangement of a phase changer.

Fig. 7 illustrates the rectangular pulse produced by the pulse generator, and

Figure 8:
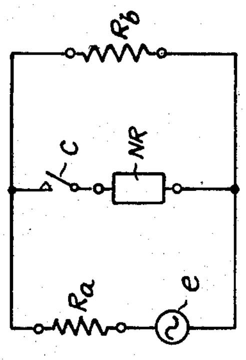

Fig. 8 shows a circuit containing a non-linear device.

Figure 1:
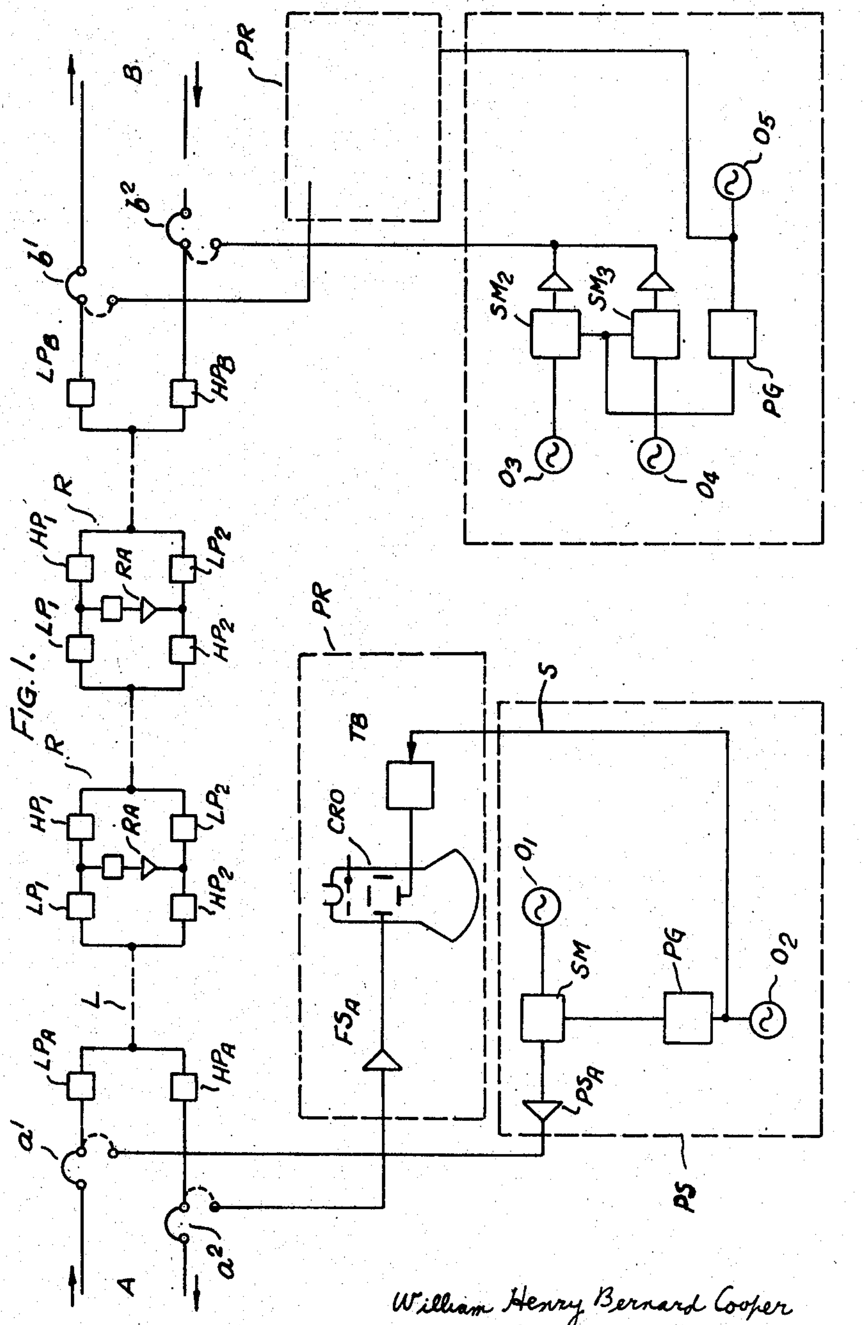

Referring to the drawings, a terminal station at A is connected via a line L with a terminal station at B through intermediate amplifiers RA of repeaters R. With the exception of the pulse transmitting means, the pulse receiver and measuring apparatus at the terminal stations and the non-linear device at the intermediate amplifier stations to be described below, the terminal stations A and B and the intermediate amplifiers RA each with their associated filter networks $LP_1$, $LP_2$ and $HP_1$ and $HP_2$ and attenuation equalizers E are of known type and conventional in design. A description of a system of the type indicated in Fig. 1 is given in a paper "Modern submarine cable telephony and the use of submerged repeaters" published in the Journal of the Institution of Electrical Engineers, part III, dated December 1944. While two repeaters R only are shown in Fig. 1 any other number may be employed.

In the system shown in Fig. 1 signals transmitted in normal operation by station A are confined to a lower band say between 12 and 60 kilocycles per second, of the available frequency spectrum while the signals normally transmitted by station B are confined to the upper band of the spectrum say between 72 and 120 kilocycles per second. The signals transmitted by station A pass to line L via low-pass filter LPA and through each successive repeater in turn via low-pass filters $LP_1$ and $LP_2$ and to station B via low-pass filter LPB. Similarly signals transmitted by station B pass to line L via high-pass filter HPB, through the repeaters via high-pass filters $HP_1$ and $HP_2$ and to station A via high-pass filter HPA.

In practice the intermediate amplifiers RA are designed to possess a high degree of linearity of amplitude characteristic in order to avoid the production of undesirable intermodulation noise on the system. This linearity is usually obtained by the use of negative feedback and the amount of reduction of amplification is a measure of the "goodness" of the amplifier. A reduction in the effective amplification of the individual valve stages or a degradation of linearity of individual stage characteristics will consequently degrade the performance of the amplifier. This defective state is usually the result of decreased electronic emission from the cathodes of the amplifying valves. The degree of amplitude non-linearity can be conveniently expressed in terms of the magnitude of the second and/or third order distortion or intermodulation products compared with the fundamental amplitude or amplitudes.

Where a communication system employs a number of repeaters as in that illustrated in Fig. 1, and especially where the repeaters are submerged as in a submarine cable system, it is important that the performance of the intermediate amplifiers should periodically be checked and a defective amplifier be identified.

The problem of performing such checking increases with the inaccessibility and number of the repeaters.

Not only is it important to check the linearity of an intermediate amplifier but it is also important that the signal power level at the output of such amplifier should be known and periodically be checked.

Both the linearity of amplitude characteristic and the power level can be ascertained by means of the apparatus provided by the invention the power level determination involving the use of means additional to that required to determine the linearity of the amplitude characteristic.

The apparatus provided and shown in schematic form in Fig. 1 includes at station A a pulse sender included in the rectangle shown in broken lines and marked PS, a pulse receiver in the broken line rectangle PR, and switches $a_1a_2$. The switches $a_1a_2$ are shown by solid lines in the position they occupy when the system is in normal operation for the transmission of signals from station A to station B and from station B to station A. When the performance of the intermediate amplifiers RA is to be measured the switches $a_1a_2$ are moved to the position shown in broken lines when switch $a_1$ connects the pulse sender PS with the line L and switch $a_2$ connects the line with the pulse receiver PR.

During test, with the switches $a_1a_2$ in their broken line positions the pulse sender PS is arranged to transmit a train of pulses of, in this instance, 30 kilocycles per second carrier frequency. Each pulse is of approximately 200 microseconds duration and the pulses are repeated at the rate of 100 per second. As will be described below the pulse sender PS at station A comprises two oscillators $O_1$ and $O_2$ producing respectively sine waves of 30 kilocycles and 100 cycles per second. The pulse sender PS at station A also comprises a pulse generator PG and a switching modulator SM. The pulse generator PG comprises, as indicated in Fig. 3, a phase changer PC and two square wave generators $SWG_1$ and $SWG_2$.

The pulse receiver at station A comprises a frequency selective amplifier FSA and a conventionally arranged cathode-ray oscillograph CRO and time base circuit TB, the oscillograph suitably using Y plate deflection on a linear time base to display the signals received from the line L. A time base synchronising signal is supplied to the time base circuit TB from the oscillator in the pulse sender PS over the line S.

The 30 kilocycle per second pulses are transmitted from station A to station B through the low-pass filters $LP_A$, $LP_1$, $LP_2$ and $LP_B$. Non-linearity of the intermediate amplifiers RA produces pulses of the harmonic frequency of 90 kilocycles per second of substantially 200 microseconds duration at the rate of 100 pulses per second at the output of each amplifier RA and those pulses fall into the frequency band which can pass freely through the filters $HP_1$, $HP_2$ and $HP_A$ and thus pass back over the line to station A and via amplifier FSA to the oscillograph CRO where they are identified on a time delay basis as coming from particular amplifiers RA and their magnitude indicated.

The nature of the non-linearity at the intermediate amplifiers RA is such that the 30 kilocycles per second pulse is substantially unimpaired by its transmission through the amplifiers while the 90 kilocycles per second pulses also in their return to station A, are substantially unimpaired by any non-linearity existing in the return path although, of course, these 90 kilocycles per second pulses are amplified by any intermediate amplifier RA through which they may pass in their return to station A.

Figure 4:
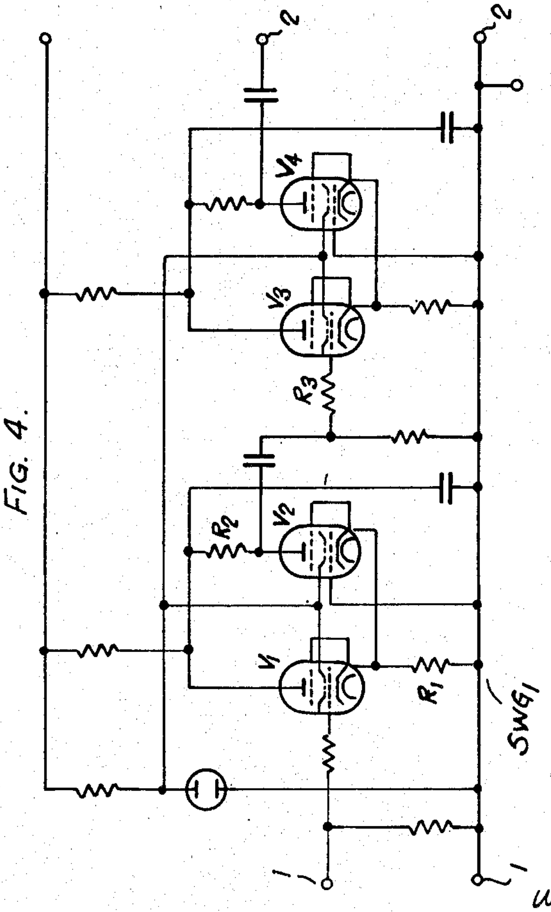
Fig. 4 shows the circuit arrangement of a suitable square wave generator.

Referring more particularly to Fig. 4, the output from oscillator $O_2$ which is of conventional design is applied to input terminals 1, 1 and to the grid of a pentode valve $V_1$ of square wave generator $SWG_1$. The cathode of this valve $V_1$ is connected to earth via resistance $R_1$ and directly to the cathode of a similar valve $V_2$. The grid of valve $V_2$ is earthed. The screen grids of valves $V_1$ and $V_2$ are connected together and to a suitable source of potential. A resistance $R_2$ is connected in the anode circuit of valve $V_2$ and the valve output applied via condenser $C_1$ and resistance $R_3$ to the grid of valve $V_3$ of a pair of valves $V_3$ and $V_4$ which are arranged in similar fashion to valves $V_1$ and $V_2$.

Current flows through valve $V_2$ in dependence on the variations in the voltage of the cathode of valve $V_2$ due to the current flowing through resistance $R_1$ and by employing valves with suitable anode current grid voltage characteristics a wave form substantially as shown at W, in Fig. 7 is produced at the output terminals 2, 2 of the square wave generator.

Square wave generator $SWG_2$ is similar to generator $SWG_1$ but in this generator it is preferred to provide means for applying via a bias battery and potentiometer, a variable bias voltage to the grid of valve $V_2$ so that the operating point on the characteristic of this valve can be adjusted and the wave form of the output voltage of the valve $V_2$ varied. The input to the generator $SWG_2$ is delivered from oscillator $O_2$ via a phase changer PC as shown in Fig. 5 by means of which the square wave shown at $W_2$ in Fig. 7 is arranged to be not quite 180° out of phase with the wave $W_1$. The phase changer PC which comprises a pentode valve $V_5$ is provided with a potentiometer $P_1$, in series with condenser $C_2$, by adjustment of which the length of the pulse shown at $W_3$ in Fig. 7 may be controlled. Adjustment of potentiometer $P_2$ controls the amplitude of the 100 cycles per second input to square wave generator $SWG_2$ which is connected to output terminals 3, 3, of the phase changer.

The output of the square wave generator $SWG_1$ and $SWG_2$ is applied to terminals 4, 4 of potentiometer $P_3$ of the modulator SM shown in Fig. 6. The movable contact of potentiometer $P_4$ is connected to one terminal of potentiometer $P_4$, the other terminal of which is earthed. The movable contact of potentiometer $P_5$ is connected to grid bias battery GB which is connected via the mid point of resistance RP with the grids of two pentode valves $V_6$, $V_7$ in push-pull.

The output of the 30 kilocycles per second oscillator $O_1$ is applied to input terminals 5, 5 of the modulator and the grid of a pentode valve $V_8$ which is connected across the grids of valves $V_6$ and $V_7$.

The cathodes of valves $V_6$ and $V_7$ are connected to potentiometer $P_6$, the movable contact of which is connected to earth.

The anodes of the valves $V_6$ and $V_7$ are connected to the primary of output transformer $T_1$ the centre tapping of which is earthed via potentiometer $P_7$, the movable contact of which is connected to the screen grid of valve $V_6$ and, via condenser $C_3$, to earth. Potentiometers $P_6$ and $P_7$ are provided to enable the push-pull stage to be balanced. Potentiometer $P_4$ enables the amplitude of the pulse to be controlled while potentiometer $P_3$ is provided to enable the successive square waves to be made equal in amplitude.

The arrangement shown is such that the output of the modulator is zero except during the duration of the positive pulses.

The pulse output of the modulator SM is applied via output terminals 6, 6 to a single stage amplifier PSA indicated in Fig. 3 and thence to line L.

The 30 kilocycle per second pulses thus transmitted to line L pass through each amplifier R to station B. As stated above pulses of harmonic frequency due to non-linearity of the amplifiers RA are passed back to station A and to pulse receiver PR. They are received by amplifier FSA and tuned to receive the particular harmonic signal, in this case the third harmonic, sent back from the amplifiers RA. The output circuit of the amplifier FSA is connected in conventional manner with the oscillograph CRO. As will be understood the oscillograph arranged as referred to above displays the received pulses as a number of spaced signals located on a linear time base according to the particular amplifier RA from which they originated.

In the case of station B, should this station be fitted with pulse transmitting and receiving apparatus the apparatus described with reference to station B has to be modified. As station B sends over the upper frequency band of 72 to 120 kilocycles per second it is now not possible with the system arranged as described to transmit pulses at one frequency and receive pulses at a harmonic frequency. Consequently station B is provided with two oscillators $O_3$ and $O_4$ to produce sine waves of 80 kilocycles per second and 110 kilocycles per second respectively and the oscillator $O_5$ to provide the 100 cycle per second sine wave as in station B. A pulse generator PG arranged as the generator at station A is provided and two modulators $SM_2$ and $SM_3$ arranged for the modulation of the waves from oscillators $O_3$ and $O_4$. The resultant pulses at 80 and 110 kilocycles per second are transmitted to line L and to amplifiers RA. Non-linearity of the amplifiers produces third order modulation products of a frequency of 50 kilocycles per second which are transmitted back to station B by way of the low pass filters $LP_1$, $LP_2$ and $LP_B$ to a pulse receiver PR at station B which receiver is arranged in like manner to that at station A, the receiving amplifier in this case being tuned broadly to 50 kilocycles per second. The duration of the pulses in this case are suitably the same as described with reference to station A.

Figure 2:
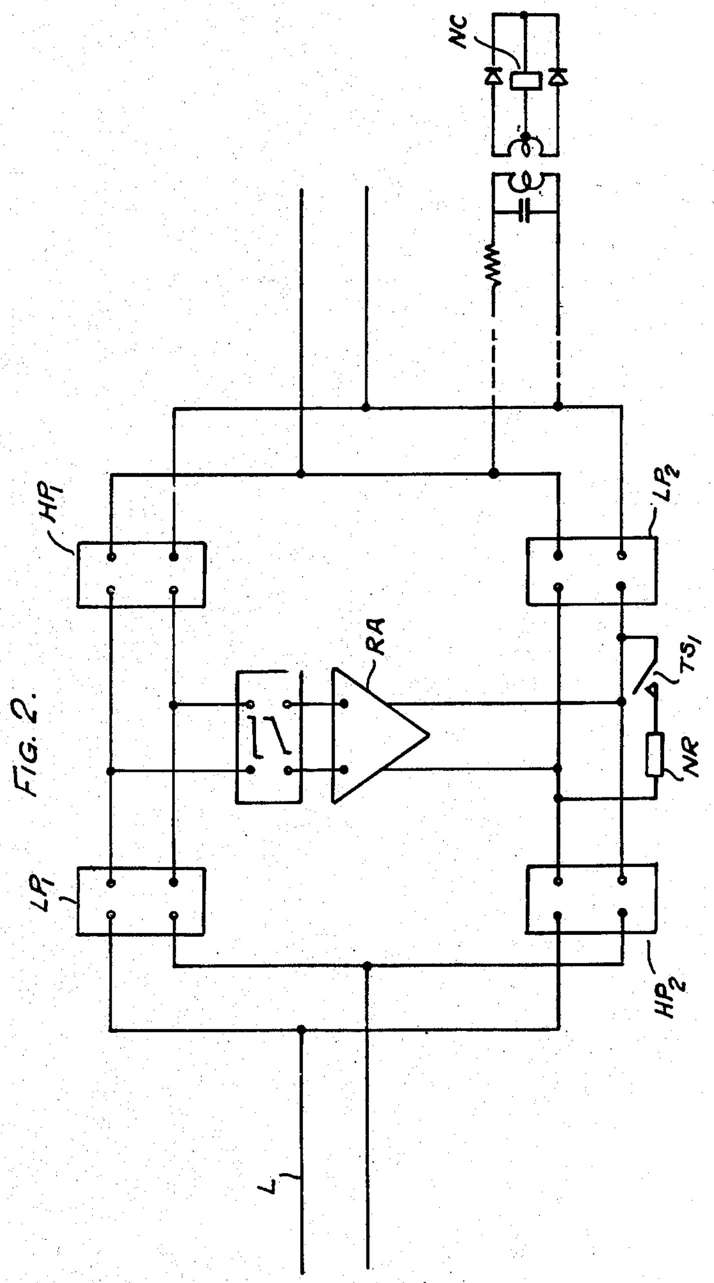
Fig. 2 is a block schematic diagram of an intermediate amplifier and associated filter networks together with an arrangement for switching a non-linear resistance device to the system.

It will be appreciated that while the actual power level existing, at the time of test, at the various intermediate amplifier output circuits will affect the magnitude of the harmonic production at these points, the apparatus described above will nevertheless indicate the effective contribution of each amplifier RA to over-all non-linearity of the system.

Where it is desired to ascertain the power level at the output of the amplifiers RA the arrangement shown in Fig. 2 is employed. The pulse sending and receiving apparatus at the terminal station A, and also station B, is unchanged. As shown in Fig. 2 a calibrated device NR having a non-linear voltage-current characteristic is connected, suitably by known switching means such as is indicated at TS where the operating coil NC is energised from line L through a tuned circuit to close contacts $TS_1$ and connect the non-linear device NR to the system. This device NR has the property of producing voltages in the line L of harmonic frequency and the characteristics of the particular device employed being known the pulses of harmonic frequency transmitted back to say station A, in consequence of the transmission of pulses of 30 kilocycles per second as already described, can be used to determine the power level at the output of each amplifier RA at which a device NR is connected. Various types of non-linear devices may be employed including diode valves, metal rectifiers and silicon carbide resistors. A form of silicon carbide marketed under the name "ATMITE" has been used successfully.

The behaviour of the non-linear device will be described with reference to Fig. 8. In this figure a resistor $R_a$ and generator $e=E \sin \omega t$ represents the output of an amplifier having a signal pulsatance $\omega$ radians per second impressed to its input terminals. The resistance $R_b$ represents the load circuit which in general will be the input terminals of the transmitting medium e. g. a submarine cable. The dipolar element NR represents the non-linear element which may be determined to have a voltage current characteristic represented by the single valued function $$I=KV^n$$

where I represents current, V voltage, K a constant and $n$ any positive odd integer. In general the single valued function would be represented by a power series but for the sake of simplification only the predominant term is here considered.

The non-linear circuit is connected, in Fig. 8, by closure of relay contact C, across the load circuit $R_b$.

It can be shown that, provided the connection of MR does not appreciably change the fundamental voltage existing across $R_b$, the connection of MR will produce a voltage across $R_b$ given by:

$$e_b=R_a\left(\frac{R_b}{R_a+R_b}\right)^{n+1}\times(Ke^n)$$

i. e. $e_b \alpha e^n$

Assuming now that $n=5$ $$e_b \alpha E^5 \, (10 \sin \omega t - 5 \sin 3\,\omega t + \sin 5\,\omega t)$$

It will be seen that the amplitude of the third harmonic, for example, varies as the fifth power of the fundamental amplitude.

From the above explanation it will be understood that the connection of a non-linear device having the above characteristic produces harmonics of such magnitude that when calculating the magnitude of the output level of an amplifier RA from the indications given by the oscillograph CRO, the results of errors in the assessment of the transmission characteristic of the system are much reduced. For example an error in the assessment of the return path transmission of say 5 db would result in an error of only 1 db in the deduction of the power level at the output of an amplifier RA. It will be understood that the non-linear device NR need not necessarily produce a harmonic having an amplitude which varies with as high as the fifth power of the fundamental as it will be appreciated that the primary function of the device is to produce harmonics which can be transmitted back to the station A in the example described.

It will also be appreciated that while the third harmonic has been selected, in the above description, for diversion back to the terminal station from an intermediate amplifier other harmonics may be so selected depending on the transmission characteristics of the system.

While the invention has been described with reference to a 2-wire system employing single repeaters at intermediate amplifying stations, the invention is not confined to such systems and may be applied to, for example 4-wire systems. In such cases suitable filter networks are inserted to direct pulses of harmonic frequency or third or other order intermodulation products to the pulse transmitting terminal station.

We claim:

1. In a communication system, and in combination, attended stations, a plurality of unattended repeater stations separated from said attended stations and from each other and disposed intermediate said attended stations, a transmission line joining said attended stations and said unattended repeater stations, an amplifier at each of said unattended repeater stations, a pulse generator at an attended station, means at the said attended station for applying a pulse signal from said generating means at a determined frequency to said transmission line, a signal receiver at an attended station tuned for receiving non-linear distortion products produced by non-linearity of the characteristic of a portion of the system between the attended repeater stations, and signal amplitude measuring means at said last-mentioned attended station for measuring the amplitude of said non-linear distortion products.

2. In a communication system, and in combination, an attended station, a plurality of unattended repeater stations separated from said attended station and from each other, a transmission line joining said attended station and said unattended repeater stations, an amplifier at each of said unattended repeater stations, a pulse generator at said attended station, means at the attended station for applying a pulse signal from said generating means at a determined frequency to said transmission line, filter means at the output of each said amplifier for directing non-linear distortion products resulting from the said application of a signal pulse and produced at the output of an amplifier at an unattended repeater station to the said attended station, a signal receiver at the said attended station tuned for receiving the said non-linear distortion products and signal amplitude measuring means at said attended station for measuring the amplitude of said non-linear distortion products.

3. In a communication system, and in combination, an attended station, a plurality of unattended repeater stations separated from said attended station and from each other, a transmission line joining said attended station and said unattended repeater stations, an amplifier at each of said unattended repeater stations, a pulse generator at said attended station, means at the attended station for applying a pulse signal from said generating means at a determined frequency to said transmission line, pulse converting means having a non-linear voltage-current characteristic and means for connecting said converting means to the system, filter means connected to the line for directing non-linear distortion products produced by said non-linear converting means to the said attended station, receiving means at the said attended station for receiving the said non-linear distortion products, and signal amplitude measuring means at said attended station for measuring the amplitude of said non-linear distortion products.

4. In a communication system, and in combination, attended stations, a plurality of unattended repeater stations separated from said attended stations and from each other and disposed intermediate said attended stations, a transmission line joining said attended stations and said unattended repeater stations, an amplifier at each of said unattended repeater stations, a pulse generator at an attended station, means at the attended station for applying a pulse signal from said generating means at a determined frequency to said transmission line, a signal receiver at an attended station tuned for receiving a pulse of a frequency higher than the applied pulse frequency, and signal amplitude measuring means at said last-mentioned attended station for measuring the amplitude of said received pulse.

5. In a communication system, and in combination, attended stations, a plurality of unattended repeater stations separated from said attended stations and from each other and disposed intermediate said attended stations, a transmission line joining said attended stations and said unattended repeater stations, an amplifier at each of said unattended repeater stations, pulse generating means at an attended station, means at the attended station for applying simultaneously pulse signals from said generating means of different determined frequencies to the said transmission line, a signal receiver at an attended station tuned for receiving a pulse of frequency different from the frequencies of either of the said applied pulse signals, and signal amplitude measuring means at said last-mentioned attended station for measuring the amplitude of said received pulse.

6. In a communication system, and in combination, an attended station, a plurality of unattended repeater stations separated from said attended stations and from each other, a transmission line joining said attended station and said unattended repeater stations, an amplifier at each of said unattended repeater stations, a pulse generator at said attended station, means at the attended station for applying a pulse signal from said generating means at a determined frequency to said transmission line, filter means connected to the line for directing a pulse of frequency higher than the frequency of said applied signal pulse to the said attended station, a signal receiver at the said attended station tuned for receiving said pulse of higher frequency, and signal amplitude means at said attended station for measuring the amplitude of said received pulse.

7. In a communication system, and in combination, an attended station, a plurality of unattended repeater stations separated from said attended stations and from each other, a transmission line joining said attended station and said unattended repeater stations, an amplifier at each of said unattended repeater stations, pulse generating means at said attended station, means at the attended station for applying simultaneously pulse signals from said generating means of different determined frequencies to the said transmission line, filter means for directing a pulse of frequency different from the frequencies of either of the said applied frequencies to the said attended station, a signal receiver at the said attended station tuned for receiving the pulse of frequency different from the frequencies of either of the said applied pulse signal, and signal amplitude measuring means at said last-mentioned attended station for measuring the amplitude of said received pulse.

8. A combination as claimed in claim 2 wherein the attended station further comprises time-delay measuring means for measuring the time delay between the application of a pulse signal to the line and the reception of the non-linear distortion products.

9. A combination as claimed in claim 3 wherein the attended station further comprises time-delay measuring means for measuring the time delay between the application of a pulse signal to the line and the reception of the non-linear distortion products.

10. A combination as claimed in claim 6 wherein the attended station further comprises time-delay measuring means for measuring the time delay between the application of a pulse signal to the line and the reception of the pulse of higher frequency.

11. A combination as claimed in claim 7 wherein the attended station further comprises time-delay measuring means for measuring the time delay between the application of the pulse signals of different determined frequencies to the line and the reception of the pulse of frequency different from the frequencies of the applied pulse signals.

12. In a communication system, and in combination, an attended station, a plurality of unattended repeater stations separated from the said attended station and from each other, a transmission line joining said attended station and said unattended repeater stations, an amplifier at each of said unattended stations, a pulse generator at said attended station, means at the said attended station for applying a pulse signal from said generating means at a determined frequency to said transmission line, filter means connected to the line at the outut of the amplifier at each unattended repeater station, said filter means being arranged to direct non-linear distortion products resulting from the said application of a signal pulse and produced by the amplifier to the said attended station, a signal receiver at the said attended station tuned for receiving the said non-linear distortion products, and signal amplitude receiving means at said attended stations for measuring the amplitude of said non-linear distortion products.

13. In a communication system, and in combination, an attended station, a plurality of unattended repeater stations separated from the said attended station and from each other, a transmission line joining said attended station and said unattended repeater stations, an amplifier at each of said unattended stations, a pulse generator at said attended station, means at the said attended station for applying pulse signals from said generator at a determined frequency to said transmission line, pulse converting means at each unattended repeater station which in response to said pulse signals produces pulses of frequency higher than that of the pulse signal frequency, switching means for connecting said converting means to the said line, filter means at each said unattended repeater station for directing said pulses of higher frequency to the said attended station, a signal receiver at the said attended station, signal amplitude measuring means at said attended station for measuring the amplitude of said pulses of higher frequency, and time-delay measuring means at said attended station for measuring the time delay between the application of a pulse signal to the line and the reception of a said pulse of higher frequency.

14. A combination as claimed in claim 13 wherein the pulse converting means for producing said pulses of higher frequency is one having a non-linear voltage-current characteristic according to a high-power non-linear law.

15. In a communication system, and in combination, an attended station, a plurality of unattended repeater stations separated from said attended stations and from each other, a transmission line joining said attended station and said unattended repeater stations, means for generating pulse signals having a substantially rectangular envelope at said attended station, filter means at said attended station arranged to remove unwanted frequencies from the pulse signals, means at the said attended station for applying a pulse signal from said generating means at a determined frequency to said transmission line, filter means at each unattended repeater station for directing non-linear distortion products resulting from the said application of a pulse signal produced by the system to the said attended station, a signal receiver at said attended station tuned for receiving said non-linear distortion products, signal amplitude measuring means at said attended station for measuring the amplitude of said received non-linear dictortion products, and time-delay measuring means at said attended station for measuring the time delay between the application of a pulse signal to the line and the reception of the said non-linear distortion products.

16. In a communication system, means by which information is transmitted over a transmission line in one direction between attended stations over an upper frequency band and in the other direction over a lower frequency band, said means including a number of unattended repeater stations each having an amplifier and spaced one from the other and from the attended stations, a pulse generator at an attended station, means at said attended station for applying a pulse signal from said generator to the transmission line, filter means at each said unattended station for directing non-linear distortion products resulting from the said application of a pulse signal and produced by the amplifier at any of said unattended stations to said last mentioned attended station, a signal receiver at said last mentioned attended station tuned for receiving said non-linear distortion products, signal amplitude measuring means at said last mentioned attended station for measuring the amplitude of said non-linear distortion products, and time-delay measuring means at said last mentioned attended station for measuring the time delay between the application of said pulse signal to said transmission line and the reception at said last mentioned attended station of said non-linear distortion products.

17. In a communication system, means by which information is transmitted over a transmission line in one direction between attended stations over an upper frequency band and in the other direction over a lower frequency band, said means including a number of unattended repeater stations each having an amplifier and spaced one from the other and from the attended stations, a pulse generator at an attended station, means at said last mentioned attended station for applying a pulse signal from said generator to the transmission line, pulse converting means having a non-linear voltage-current characteristic and means for connecting said converting means to the line at an unattended repeater station, filter means at each said unattended station for directing non-linear distortion products resulting from the said application of a pulse signal and produced by said non-linear converting means to the said last mentioned attended station, a signal receiver at said last mentioned attended station tuned for receiving said non-linear distortion products, signal amplitude measuring means at said last mentioned attended station for measuring the amplitude of said non-linear distortion products, and time-delay measuring means at said last mentioned attended station for measuring the time delay between the application of said pulse signal to said transmission line and the reception at said last mentioned attended station of said non-linear distortion products.

18. The method of measuring the performance of an intermediate amplifier in a communication system which comprises performing, in said system, the steps of transmitting pulses of a predetermined frequency, passing any non-linear distortion products resulting from said pulse transmission and of a frequency higher than the predetermined frequency, and measuring the amplitude of any such non-linear distortion products.

19. The method of measuring the performance of an intermediate amplifier in a communication system which comprises performing, in said system, the steps of transmitting pulses of a predetermined frequency, passing any pulses of a frequency higher than said predetermined frequency resulting from said pulse transmission, and measuring the amplitude of any such higher frequency pulses.

20. The method of measuring the performance of an intermediate amplifier having an amplification factor and a converting means including a non-linear distortion device of predetermined value connected therewith in a communication system which method comprises performing, in said system, the steps of transmitting pulses of a predetermined frequency producing amplifier output pulses, modifying the said output pulses in accordance with a predetermined non-linear voltage-current relationship to produce resultant pulses having a frequency that is a harmonic of the predetermined frequency, passing said resultant pulses in a predetermined direction, and measuring the amplitude of the pulses of harmonic frequency.

21. The method of measuring the performance of an intermediate amplifier in a communication system which comprises performing, in said system, the steps of transmitting pulses of a predetermined frequency, passing any non-linear distortion products resulting from said pulse transmission and of a frequency higher than the said predetermined frequency, measuring the amplitude of such non-linear distortion products, and measuring the time delay between transmission of a pulse and reception of a pulse at said higher frequency.

22. The method of measuring the performance of an intermediate amplifier in a communication system which comprises performing, in said system, the steps of transmitting simultaneously two pulses of different frequencies producing a single resultant amplifier output pulse, passing the resultant pulse in a predetermined direction, and measuring the amplitude of said resulting pulse.

23. The method of measuring the performance of an intermediate amplifier in a communication system which comprises performing, in said system, the system of transmitting from a terminal station simultaneously two pulses of different frequencies producing a single resulting amplifier output pulse, passing the resultant pulse in a predetermined direction, measuring the amplitude of said resultant pulse, and measuring the time delay between transmission of the two pulses and the reception of the resultant pulse.

WILLIAM HENRY BERNARD COOPER.
WINSTON THEODORE DUERDOTH.

REFERENCES CITED

The following references are of record in the file of this patent:

UNITED STATES PATENTS

| Number | Name | Date |
|---|---|---|
| 1,581,576 | Horton | Apr. 20, 1926 |
| 2,208,417 | Gilbert | July 16, 1940 |
| 2,243,599 | Herbst | May 27, 1941 |
| 2,260,160 | Benning | Oct. 21, 1941 |
| 2,315,434 | Seibe | Mar. 30, 1943 |
| 2,315,435 | Seibe | Mar. 30, 1943 |
| 2,321,723 | Zinn | June 15, 1943 |
| 2,364,190 | Burgess | Dec. 5, 1944 |
| 2,432,214 | Gontheimer | Dec. 9, 1947 |

FOREIGN PATENTS

| Number | Country | Date |
|---|---|---|
| 23,397/35 | Australia | July 6, 1935 |